Oct. 18, 1938.   H. A. PERLMUTTER   2,133,923
LAMP JOINT
Filed April 24, 1936
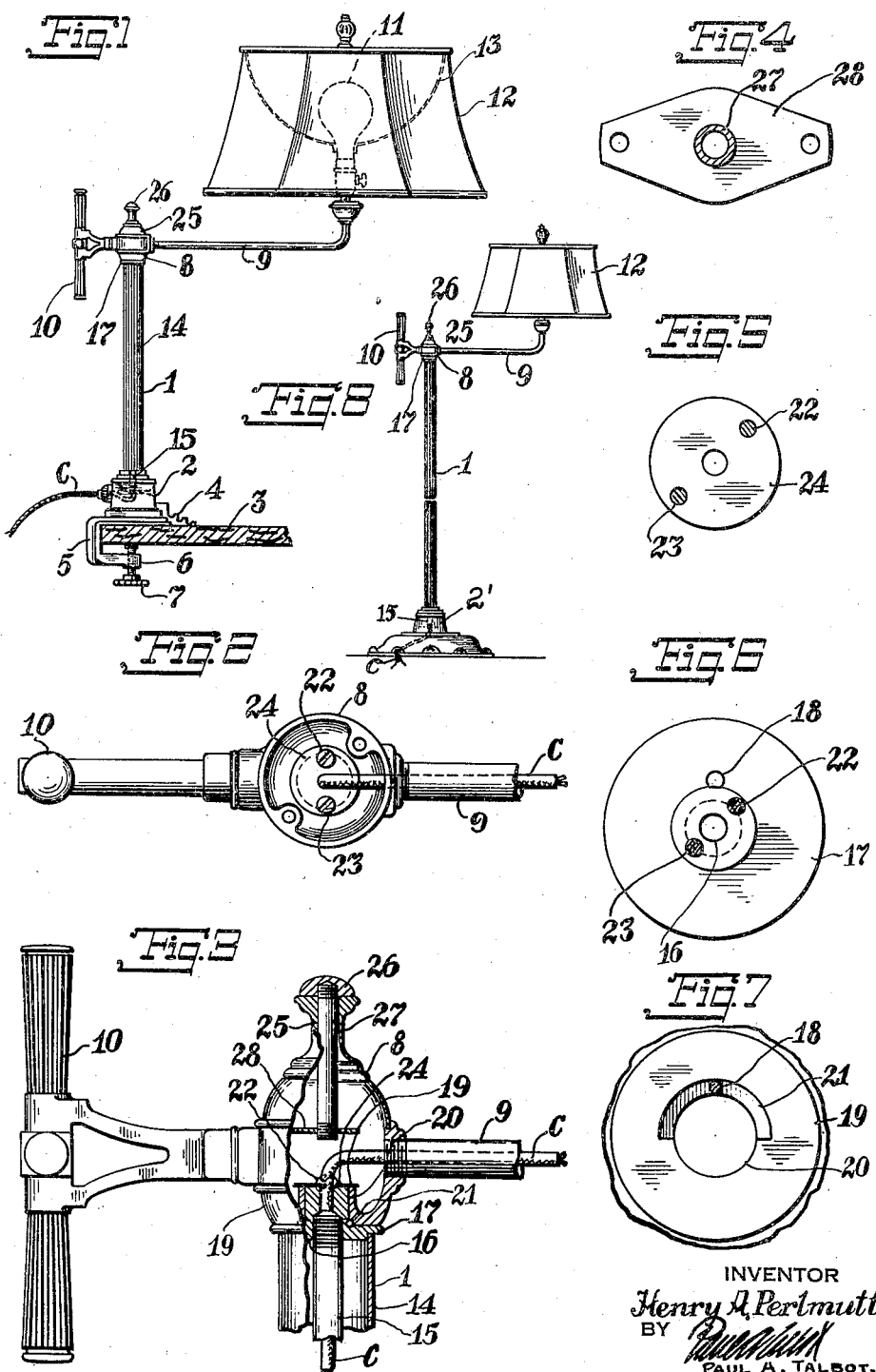

Patented Oct. 18, 1938

2,133,923

UNITED STATES PATENT OFFICE 2,133,923

LAMP JOINT

Henry A. Perlmutter, New York, N. Y., assignor to Artistic Lamp Manufacturing Company, Inc.

Application April 24, 1936, Serial No. 76,118

3 Claims. (Cl. 285—1)

My invention relates to a lamp for desks and particularly a lamp having a swinging arm and a joint for same and has for its objects to provide:

A joint for a swinging arm which will not wear loose.

A joint for a swinging desk lamp having a uniform tension and no slack motions.

A joint and limiting stop which remains tight and withstands frequent operation without becoming loose.

I accomplish these and other objects by the construction herein described and shown in the accompanying drawing in which:

Figure 1 is an elevation of my lamp.

Figure 2 is a fragmentary plan view of the joint.

Figure 3 is a partial section and elevation of the joint and swinging arm.

Figures 4, 5, 6, and 7 are details of parts of my joint for lamps.

Figure 8 is an assembled view of a modification of the base.

Similar reference characters refer to similar parts throughout the several views of the accompanying drawing forming a part hereof and in the following specification.

My invention comprises a stanchion 1 having a base 2 resting on the top of the desk, table or other piece of furniture 3. The base 2 is preferably provided with a groove 4 for pens, pencils and the like and at its rear arm 5 is extended downwardly and so terminated into a boss 6 at its lower end that the clamp screw 7 engaging the threads in said boss 6 will, upon being screwed up and tightened, engage the under edge of the desk firmly holding said stanchion 1 and the parts it supports to the desk or other piece of furniture 3. The base 2', Figure 8, also is threaded to receive conduit 15.

At the upper end of said stanchion 1 I have provided a swinging joint 8 having a lamp supporting arm 9 and diametrically opposite to said arm, a handle 10 to assist in swinging the lamp 11 through an arc of the desired number of degrees of the circle to which my device is limited.

The means of limiting the travel of said arm to less than a complete circle and thus preventing the cord or cable C from being damaged as well as the means hereinafter described of maintaining a substantially tight joint throughout the life of my device are important features of my invention. The joint and robust construction particularly of the stanchion 1 is unique because vibration is practically eliminated even though the weight of the lamp 11, shade 12 and reflector 13 is unusually heavy.

The stanchion 1 comprises an outer tubular casing 14 which is clamped between the base 2 and joint 8 by the internal pipe or conduit 15 which is threaded at each end to engage said base and the journal member 16 of the joint. The extending flange 17 engages the upper end of said casing 14 and thus when screwed up and tightened firmly clamps said casing in place. The upper surface of said flange is provided with a stop pin 18. The lower housing 19 is provided with the bearing 20 snugly fitting the journal member 16 and at the lower end surface thereof is provided a segmental recess 21 permitting said stop pin 18 to freely travel therein until striking the ends of said recess. It is thus that the travel of the parts carried by said joint is limited to travel less than a complete circle.

The upper end of said bearing projects slightly above the journal member 16 which is preferably tapped for screws 22 and 23 to secure the slightly springy disc shaped end plate 24 thereto. Said plate 24 engages the end of the bearing 20 and forces the lower end of the housing firmly against the flange 17. The springy nature of said plate 24 compensates for the slight wear of the joint and maintains an even tension by friction in this way overcoming slack motion or looseness.

The upper housing and ornamental top 25 are preferably removably held in place by the nut 26 threaded pipe nipple 27 and threaded bar 28 secured to said lower housing 19.

The cord or cable C supplying the current to the lamp 11 enters the rear of the base 2 passes up through the conduit 15 and through the hollow center of the journal member 16 and the central aperture of the plate 24 and thence through the swinging 9 which is secured to the lower housing 19 and which terminates into the lamp housing to which the socket, bulb, reflector and shade are secured.

I have herein shown and described my device in its preferred form so that it may be readily understood. The construction, however, may be changed to suit varying conditions such as the size and number of the parts, the type of lamp and shade and its application to various types of desk and tables, etc. and I do not wish to be limited to the specific construction as I may wish to depart therefrom within the scope of the appended claims which succinctly set forth my invention.

I claim:

1. In a swinging joint for electric lamps, said swinging joint comprising a hollow journal member, a housing having an inwardly projecting bearing engaging said journal member and rotatable therearound, and an apertured springy plate secured to said journal member within and concealed by said housing and resting against the inner end of said bearing whereby slack motion is taken up by said plate and whereby an electric conductor may pass through said hollow journal member and said apertured springy plate.

2. In a swinging joint for electric lamps, said swinging joint comprising a hollow journal member, a housing having an inwardly projecting bearing engaging said journal member and rotatable therearound, and an apertured springy plate secured to said journal member within and concealed by said housing and resting against inner end of said bearing whereby slack motion is taken up by said plate and whereby an electric conductor may pass through said hollow journal member and said apertured springy plate, and means engaging said housing and secured to said journal member limiting the travel of said housing around said journal member.

3. In a lamp joint, a journal member having a springy plate secured thereto both said journal member and said springy plate being apertured to receive an electric cable, a housing having a lamp supporting arm and a bearing projecting inwardly engaging said journal member and a removable top for said housing providing access to said springy plate and electric cable.

HENRY A. PERLMUTTER.